(12) United States Patent
Smith et al.

(10) Patent No.: US 7,310,397 B2
(45) Date of Patent: Dec. 18, 2007

(54) DATA RECOVERY CIRCUIT, PHASE DETECTION CIRCUIT AND METHOD FOR DETECTING AND CORRECTING PHASE CONDITIONS

(75) Inventors: Sterling Smith, HsinChu Hsien (TW); Sheng-Yao Liu, Taipei Hsien (TW); Huimin Tsai, Hsinchu (TW)

(73) Assignee: MStar Semiconductor, Inc. (TW)

( * ) Notice: Subject to any disclaimer, the term of this patent is extended or adjusted under 35 U.S.C. 154(b) by 773 days.

(21) Appl. No.: 10/698,623

(22) Filed: Nov. 3, 2003

(65) Prior Publication Data

US 2004/0091073 A1    May 13, 2004

Related U.S. Application Data

(60) Provisional application No. 60/423,392, filed on Nov. 4, 2002.

(51) Int. Cl.
*H04L 7/00*    (2006.01)
(52) U.S. Cl. ............... 375/355; 375/375; 375/373; 375/371; 327/9; 327/159; 327/3; 327/2; 327/141
(58) Field of Classification Search ............... 375/355, 375/375; 327/147, 149, 156
See application file for complete search history.

(56) References Cited

U.S. PATENT DOCUMENTS 5,574,756 A * 11/1996 Jeong .................... 375/376
6,538,475 B1 * 3/2003 Johansen et al. ............. 327/12
6,737,896 B2 * 5/2004 Yoshioka .................... 327/144
7,183,864 B1 * 2/2007 Gutnik ........................ 331/57
2003/0091136 A1 * 5/2003 Sugita ........................ 375/355

FOREIGN PATENT DOCUMENTS

TW         437220         8/1999

* cited by examiner

*Primary Examiner*—Chieh M. Fan
*Assistant Examiner*—Siu M Lee
(74) *Attorney, Agent, or Firm*—Michael Bednarek; Paul, Hastings, Janofsky & Walker LLP (57) ABSTRACT

In the data recovery circuit of the invention, a first group of sampling clock pulses is used for sampling approximately the central portions of the data bits in an incoming data stream to produce a first sampled data stream, while a second group of sampling clock pulses is used for sampling approximately the transition portions between every two adjacent data bits in the incoming data stream to produce a second sampled data stream. By detecting the resemblance of each bit in the second sampled data stream to the corresponding two adjacent bits in the first sampled data stream, a phase detection and correction circuit determines an early condition or a late condition for the phases of the sampling clocks and produces a signal to correct the phases of the sampling clocks by shifting the phases backwards or forwards. According to the invention, sampling clocks with lower frequencies can be used for sampling, and the phase error can be corrected to obtain the correct data recovery.

30 Claims, 7 Drawing Sheets

DATA RECOVERY CIRCUIT, PHASE DETECTION CIRCUIT AND METHOD FOR DETECTING AND CORRECTING PHASE CONDITIONS

CROSS-REFERENCE TO RELATED APPLICATIONS

This application is based upon and claims the benefit of U.S. provisional application No. 60/423,392 filed Nov. 4, 2002, the contents of which are incorporated herein by reference.

BACKGROUND OF THE INVENTION

1. Field of the Invention

The present invention relates to a data recovery circuit, and more particularly, to a circuit and a method for minimizing a phase error of a sampling clock in a data recovery circuit.

2. Description of the Related Art

DVI (Digital Visual Interface) is a digital display interface standard established by several PC and graphic card manufacturers. Thanks to the high speed and the excellent display quality of the DVI transmission system, it is foreseeable that DVI interface will become a widely used standard interface for image display in the near future.

Figure 1:
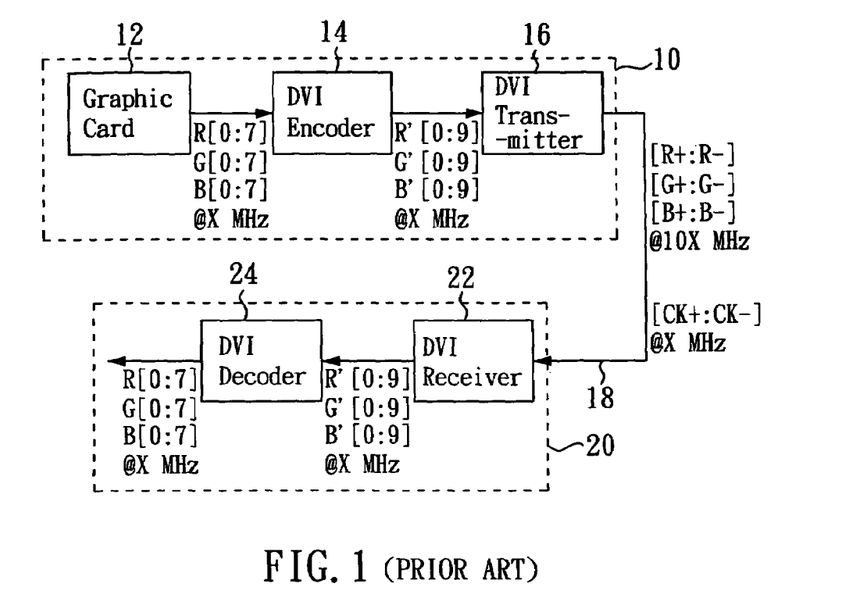
FIG. 1 illustrates the data transmission structure of a DVI display system.

FIG. 1 illustrates the data transmission structure of a display system configured with DVI standard. The system mainly comprises a host portion 10 and a display portion 20. In the host portion 10, a graphic card 12 is used to generate three 8-bit digital image signals R[0:7], G[0:7], and B[0:7] respectively for the three primary colors of red, green and blue. According to DVI standard, these 8-bit digital image signals are then sent to a DVI encoder 14 to be encoded into 10-bit DVI image signals R'[0:9], G'[0:9] and B'[0:9], which are subsequently converted by a DVI transmitter 16 into differential serial image signals [R+:R−], [G+:G−] and [B+:B−] and transmitted by a DVI transmission cable 18 to the display portion 20. Note that the three differential serial image signals [R+:R−], [G+:G−] and [B+:B−] should be transmitted respectively by three pairs of differential transmission lines. Moreover, these differential serial image signals should be transmitted at a frequency equal to ten times the rate of the 10-bit DVI image signals since they are generated from the 10-bit signals by a parallel-to-serial conversion. However, a differential clock signal [CK+:CK−] generated by the DVI transmitter 16 is transmitted at the original rate. For simplicity, all the differential transmission lines are represented by only one DVI transmission cable 18 in FIG. 1. A DVI receiver 22 in the display portion 20 is used for receiving the differential image signals and for recovering 10-bit DVI image signals from those differential image signals. Thereafter, the recovered 10-bit DVI image signals are decoded by a DVI decoder 24 into 8-bit digital image signals for display on a display panel (not shown in the drawings).

Figure 3A:
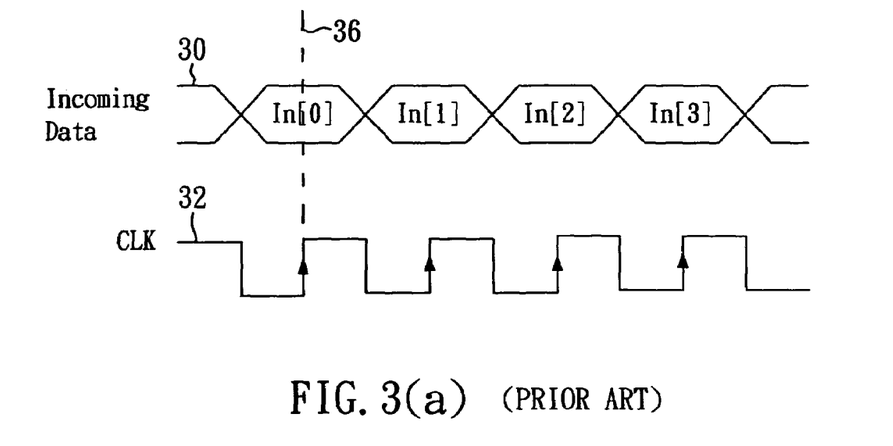

In order to recover 10-bit DVI image signals, the DVI receiver 22 is typically provided with a data recovery circuit for obtaining recovered data signals by taking samples of the differential image signals in accordance with a sampling clock generated from the received differential clock signal. A conventional serial data sampling technique is shown in FIG. 3(a), in which a clock signal 32 having a frequency equal to the rate of the incoming data 30 is generated to sample the incoming data 30. Each of the rising edges of the clock signal 32 is approximated aligned to a central portion 36 of one data bit in the incoming data 30 to ensure correct sampling of the data.

Figure 2:
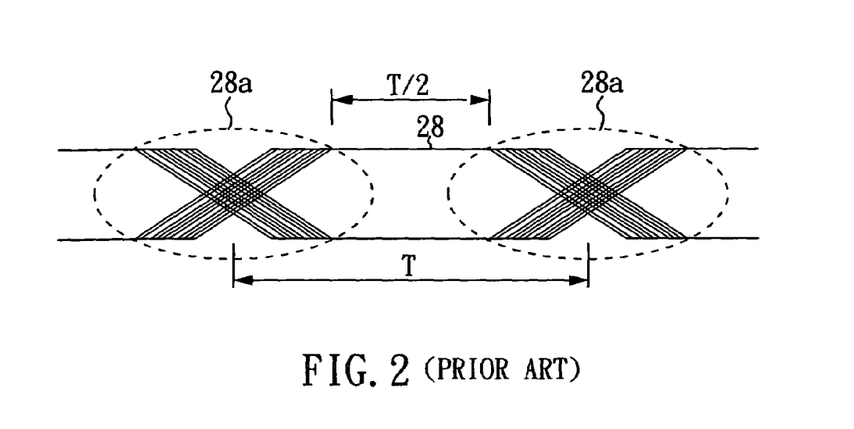
FIG. 2 is a diagram describing the interference to the data during high frequency transmission.
Figure 3B:
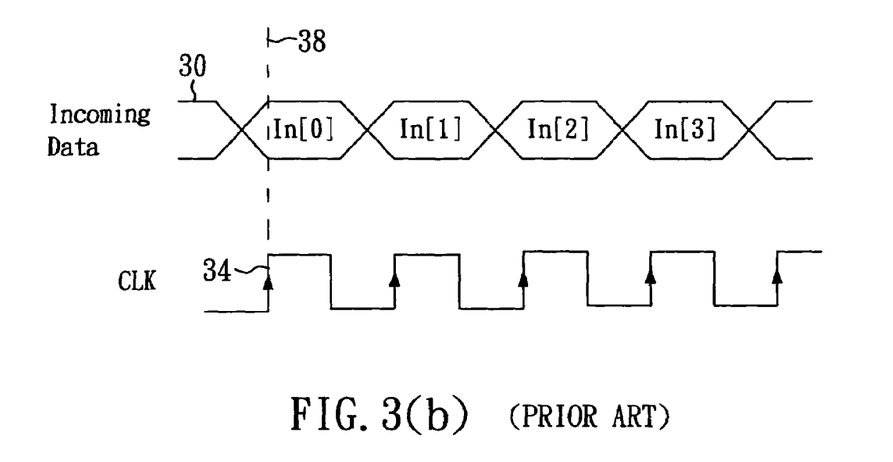

FIGS. 3(a) and 3(b) illustrate conventional serial data sampling scheme, in which FIG. 3(a) shows the condition without clock skew and FIG. 3(b) shows the condition with clock skew;

However, according to the DVI standard, the differential image signal is transmitted at an extremely high rate, for example, at several giga-hertz (GHz), and it is very difficult to generate a sampling clock with such a high frequency. Furthermore, in a data transmission high up to several giga-hertz, the transmitted signals are vulnerable to jitters and high-frequency reflective interferences, which significantly reduces the effective period for valid sampling of a data bit. As can be seen in FIG. 2, due to the reflective interferences 28a, the effective sampling period of a data bit 28 is reduced from T to about T/2. Therefore, if there is a significant skew between a sampling edge 38 of the sampling clock and a central portion 36 of a data bit in the incoming data 30, i.e., the condition that the sampling clock 34 is out of phase with the incoming data 30, as shown in FIG. 3(b), then it is very possible to obtain an incorrect sampling data.

Accordingly, there is a need to develop a data recovery circuit, which is suitable for applications of high frequency serial data transmission, and in which a sampling clock with lower frequency can be used for sampling the high frequency serial data while the sampling edges of the sampling clock are always maintained in positions aligned with the central portions of the data bits.

SUMMARY OF THE INVENTION

The object of the present invention is to provide a data recovery circuit having a sampling circuit that can be operated at a lower frequency. Therefore, the data recovery circuit is suitable for applications of high frequency serial data transmission.

Another object of the present invention is to provide a data recovery circuit having a phase detection and correction circuit for dynamically detecting and controlling the phase of a sampling clock signal to ensure that the sampling edges of the clock signal are always locked to the central portions of the data bits to thereby obtain correct recovered data.

In order to achieve the above objects, the data recovery circuit of the present invention comprises: a clock generator for generating a first group of sampling clock pulses and a second group of sampling clock pulses and being controlled in response to a phase control signal to adjust the phases of the first group of sampling clock pulses and the second group of sampling clock pulses; a data and phase sampling circuit for sampling approximately a central portion of each data bit in an incoming data stream in accordance with the first group of sampling clock pulses to produce a first sampled data stream while sampling approximately a transition portion between every two data bits in the incoming data stream in accordance with the second group of sampling clock pulses to produce a second sampled data stream; and a phase detection and correction circuit for determining the resemblance of each bit in the second sampled data stream to the corresponding two adjacent bits in the first sampled data stream, defining an early condition for the phases of the sampling clocks if each bit in the second sampled data stream resembles the former of the corresponding two adjacent bits in the first sampled data stream while defining a late condition for the sampling clocks if each bit in the second sampled data stream resembles the latter of the corresponding two adjacent bits in the first sampled data stream, and producing the phase control signal on the basis of the early condition or the late condition to adjust the phases of the sampling clocks by shifting the phases backwards or forwards.

BRIEF DESCRIPTION OF THE DRAWINGS

Objects and advantages of the present invention will be fully understood from the detailed description to follow taken in conjunction with the embodiments as illustrated in the accompanying drawings, wherein:

FIGS. 3(a) and 3(b) illustrate conventional serial data sampling scheme, in which FIG. 3(a) shows the condition without a clock skew and FIG. 3(b) shows the condition with a clock skew;

DETAILED DESCRIPTION OF THE PREFERRED EMBODIMENT

Figure 4:
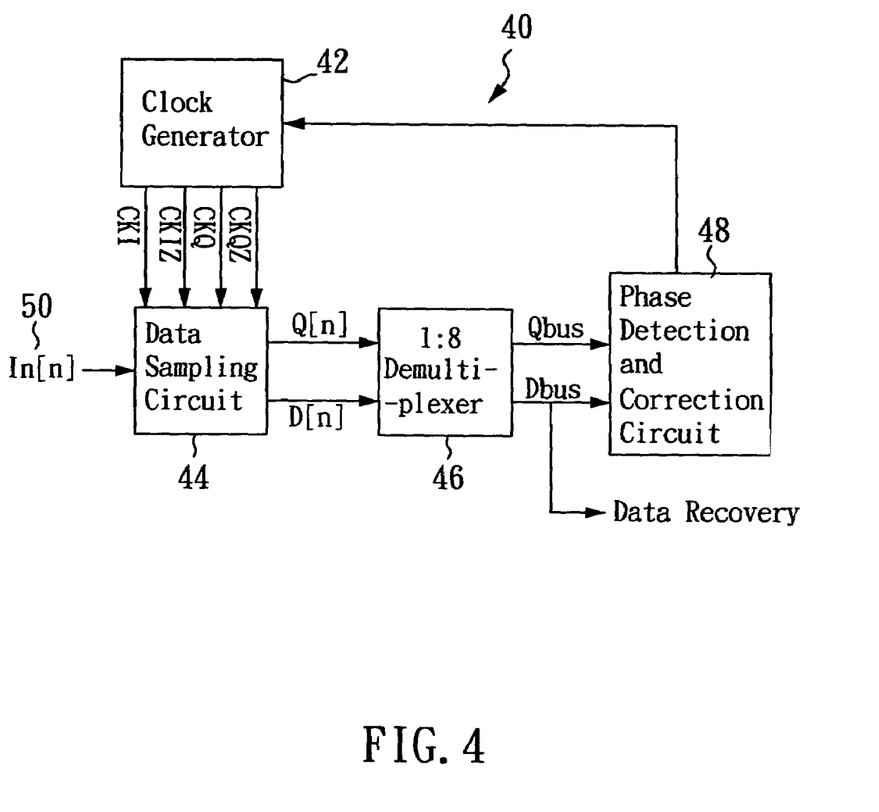
FIG. 4 depicts a schematic block diagram of a preferred embodiment of the data recovery circuit according to the present invention.

Please refer to FIGS. 4 and 5, and again to FIG. 1. FIG. 4 shows a schematic block diagram of a preferred embodiment of the data recovery circuit 40 according to the present invention. The data recovery circuit 40 mainly comprises a clock generator 42, a data and phase sampling circuit 44 and a phase detection and correction circuit 48. In addition, the data recovery circuit 40 may further be provided with a demultiplexer 46, coupled between the data and phase sampling circuit 44 and the phase detection and correction circuit 48.

Figure 5:
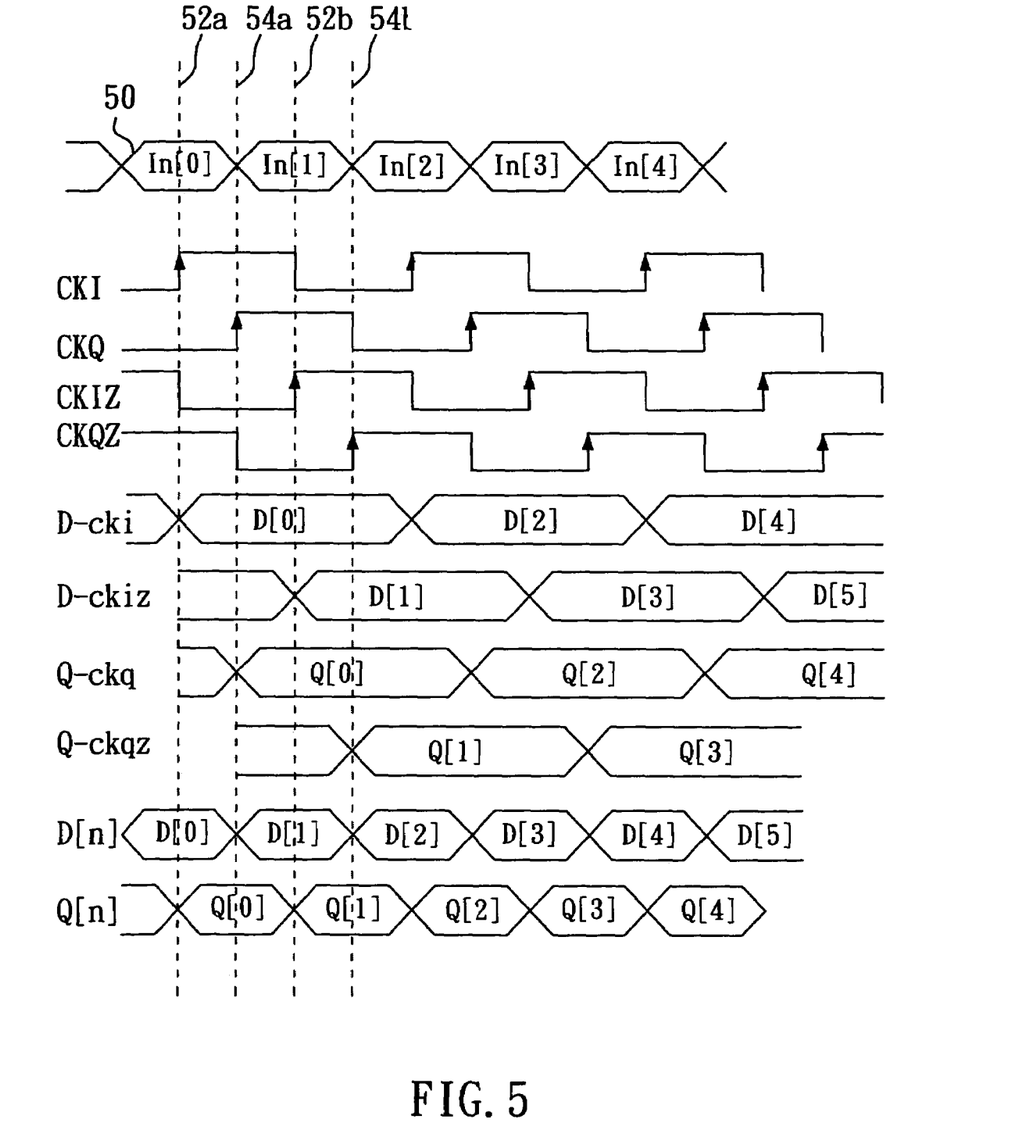
FIG. 5 is a timing diagram of the signals in the data recovery circuit according to the present invention.

The differential clock signal [CK+:CK−] transmitted through the DVI transmission cable 18 from the host potion 10 to the display portion 20 in FIG. 1 is coupled to the clock generator 42. From the received differential clock signal (CK+:CK−), the clock generator 42 generates a first group of sampling clock pulses and a second group of sampling clock pulses, each having a frequency at five times the rate of the differential clock signal [CK+:CK−]. In the preferred embodiment, the first group of sampling clock pulses includes a first clock signal CKI and a third clock signal CKIZ, and the second group of sampling clock pulses includes a second clock signal CKQ and a forth clock signal CKQZ. As previously described with reference to FIG. 1, the three differential image signals [R+:R−], [G+:G−] and [B+:B−] are transmitted at ten times of the original data rate, and thus, according to the present invention, the frequency of the first group of sampling clock pulses and the second group of sampling clock pulses used in the data recovery circuit 40 is only half of the incoming data rate. The waveforms of the four clock signals CKI, CKIZ, CKQ and CKQZ are shown in FIG. 5. The first clock signal CKI and the second clock signal CKQ are substantially 90 degrees out of phase with each other. In this embodiment, the phase of the first clock signal CKI leads the phase of the second clock signal CKQ. The third clock signal CKIZ is an inverted signal of the first clock signal CKI; i.e., the phase difference between the two clock signals CKI and CKIZ is 180 degree. Similarly, there is a 180-degree phase difference between the forth clock signal CKQZ and the second clock signal CKQ. An exemplary circuit for generating two clock signals having a 90-degree phase difference is disclosed in the U.S. patent application entitled "Apparatus for generating quadrature phase signals and data recovery circuit using the same", the serial number of which has not yet been assigned, filed by the same assignee on Aug. 26, 2003. Other schemes may also be used in generating the above described sampling clock pulses.

The four clock signals CKI, CKIZ, CKQ, CKQZ generated by the clock generator 42 are connected to the data and phase sampling circuit 44, which operates to sample a received incoming data stream In [n] 50 in accordance with the four clock signals CKI, CKIZ, CKQ, CKQZ. The incoming data stream In [n] 50 is intended to represent any one of the three differential image signals [R+:R−], [G+:G−] and [B+:B−] in FIG. 1. The data and phase sampling circuit 44 is designed to take samples of approximately the central portions 52a of the even data bits In [0], In [2], . . . in the incoming data stream In [n] 50 by using the rising edges of the first clock signal CKI to produce a sampled data stream D-cki as shown in FIG. 5, and to take samples of approximately the central portions of the odd data bits In [1], In [3], . . . in the incoming data stream In [n] 50 by using the rising edges of the third clock signal CKIZ to produce a sampled data stream D-ckiz. Meanwhile, the data and phase sampling circuit 44 samples approximately the transition portions 54a between the even data bits and the odd data bits in the incoming data stream In [n] 50 by using the rising edges of the second clock signal CKQ to produce a sampled data stream Q-ckq, and samples approximately the transition portions 54b between the odd data bits and the even data bits in the incoming data stream In [n] 50 by using the rising edges of the forth clock signal CKQZ to produce a sampled data stream Q-ckqz. The sampled data stream D-cki and the sampled data stream D-ckiz are combined together to form a first sampled data stream D[n]. Similarly, the sampled data stream Q-ckq and the sampled data stream Q-ckqz are combined together to form a second sampled data stream Q[n]

Although the rising edges of the four clock signals CKI, CKIZ, CKQ, CKQZ are used in this embodiment to sample the incoming data stream In [n], it is for exemplary purpose only, not intended to limit the scope of the present invention. In another embodiment, only two clock signals CKI and CKQ that are 90 degrees out of phase with each other are used for sampling. In this case, both rising edges and falling edges of the clock signals CKI and CKQ serve as the sampling edges. Alternatively, two clock signals having the same frequency as the incoming data rate and being 180 degrees out of phase with each other may respectively be used for sampling the central portions of the data bits and the transition portions between every two adjacent data bits. The number and the frequency of the clock signals can be chosen depending on the circuit design as long as the above described effect can be achieved.

The demultiplexer 46 connected at the output of the data and phase sampling circuit 44 is a 1:8 demultiplexer, which is used to convert the first sampled data stream D[n] and the second sampled data stream[n] from serial data to 8-bit parallel data, that is, to produce a first sampled data stream Dbus and a second sampled data stream Qbus. At the same time, the frequency is reduced to one-eighth the rate of the serial data stream. The first sampled data stream Dbus can be output for subsequent data recovery process. The 1:8 demultiplexer 46 in this embodiment is provided to facilitate the subsequent data recovery process and is describe for exemplary purpose only, not intended to limit the scope of the present invention. The 1:8 demultiplexer may also be replaced by a 1:4 demultiplexer, a 1:16 demultiplexer and the like. It is also possible that no demultiplexer is provided between the data and phase sampling circuit 44 and the phase detection and correction circuit 48.

The phase detection and correction circuit 48 is connected to the output of the demultiplexer 46 to receive the parallel data from the first sampled data stream Dbus and the second sampled data stream Qbus. The phase detection and correction circuit 48 determines whether a phase skew is present or absent between the incoming data stream In [n] 50 and the clock signals CKI, CKIZ, CKQ and CKQZ by processing the first sampled data stream Dbus and the second sampled data stream Qbus. In the case that a phase skew is present, the phase detection and correction circuit 48 generates a phase control signal to the clock generator 42 to appropriately adjust the phases of the clock signals CKI, CKIZ, CKQ and CKQZ so that the sampling edges of the second clock signal CKQ and the forth clock signal CKQZ is always locked to the transition portions between two adjacent data bits. Thereby, the sampling edges of the first clock signal CKI and the third clock signal CKIZ is always locked to the central portions of the data bits to ensure the correct sampling.

The scheme for detecting phase errors by the phase detection and correction circuit 48 is described as follows. If a transition occurs at a transition portion associated with a sampling edge of the second clock signal CKQ and the forth clock signal CKQZ, i.e., in the case that one of the corresponding two adjacent data bits is "1" and the other is "0", then the probability of obtaining a sample "1" at the transition portion should be equal to the probability of obtaining a sample "0". Therefore, referring to the timing diagrams of the first sampled data stream D[n] and the second sampled data stream Q[n] in FIG. 5, if the sampling edges of the second clock signal CKQ and the forth clock signal CKQZ are shifted to the left, failing to be aligned to the transition portions between two adjacent data bits, then there is a higher probability to obtain a sample value equal to the former of the two adjacent data bits. In other words, there is a higher probability that Q[0] is equal to D[0], Q[1] to D[1], Q[2] to D[2], and so on. If the sampling edges of the second clock signal CKQ and the forth clock signal CKQZ are shifted to the right, failing to be aligned to the transition portions between two adjacent data bits, then there is a higher probability to obtain a sample value equal to the latter of the two adjacent data bits. In other word, there is a higher probability that Q[0] is equal to D[1], Q[1] to D[2], Q[2] to D[3], and soon. Therefore, by detecting the resemblance of each bit in the second sampled data stream Q[n] to the corresponding two adjacent bits in the first sampled data stream D[n], the phase detection and correction circuit 48 can determine a phase condition of the second clock signal CKQ and the forth clock signal CKQZ. The phase condition is defined as an early condition (shift-left) if each bit in the second sampled data stream Q[n] resembles the former of the corresponding two adjacent bits in the first sampled data stream D[n], while the phase condition is defined as a late condition (shift-right) if each bit in the second sampled data stream Q[n] resembles the latter of the corresponding two adjacent bits in the first sampled data stream D[n]. Based on the determination of the early condition or the late condition, the phase detection and correction circuit 48 produces the phase control signal to the clock generator 42, indicating the clock generator 42 to correct the phases of the sampling clocks CKQ and CKQZ by shifting the phases backwards (shifting to the right) or by shifting the phases forwards (shifting to the left).

Figure 6:
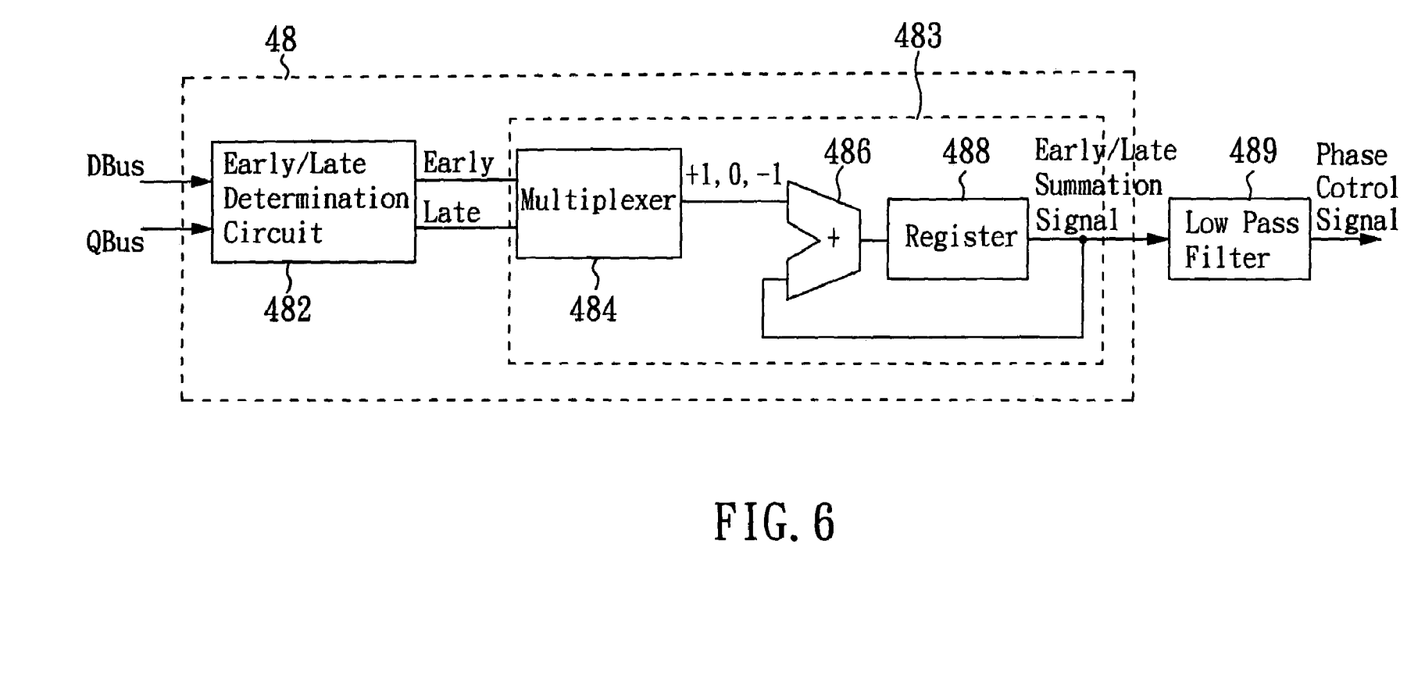
FIG. 6 depicts a schematic block diagram of a preferred embodiment of the phase detection and correction circuit according to the present invention.

Please refer to FIG. 6, which depicts a schematic block diagram of a preferred embodiment of the phase detection and correction circuit according to the present invention. As shown, the phase detection and correction circuit 48 comprises an early/late determination circuit 482, an early/late summation circuit 483 and a low pass filter 489. The first sampled data stream Dbus and the second sampled data stream Qbus generated by the 1:8 demultiplexer 46 are fed into the early/late determination circuit 482, in the format of 8-bit parallel signals, for determining whether each bit in the second sampled data stream Qbus resembles the former or the latter of the corresponding two adjacent bits in the first sampled data stream Dbus. According to the determination result, the early/late determination circuit 482 produces an early signal "Early" or a late signal "Late". The detailed structure of the early/late determination circuit 482 will be described in the following paragraph.

Figure 7:
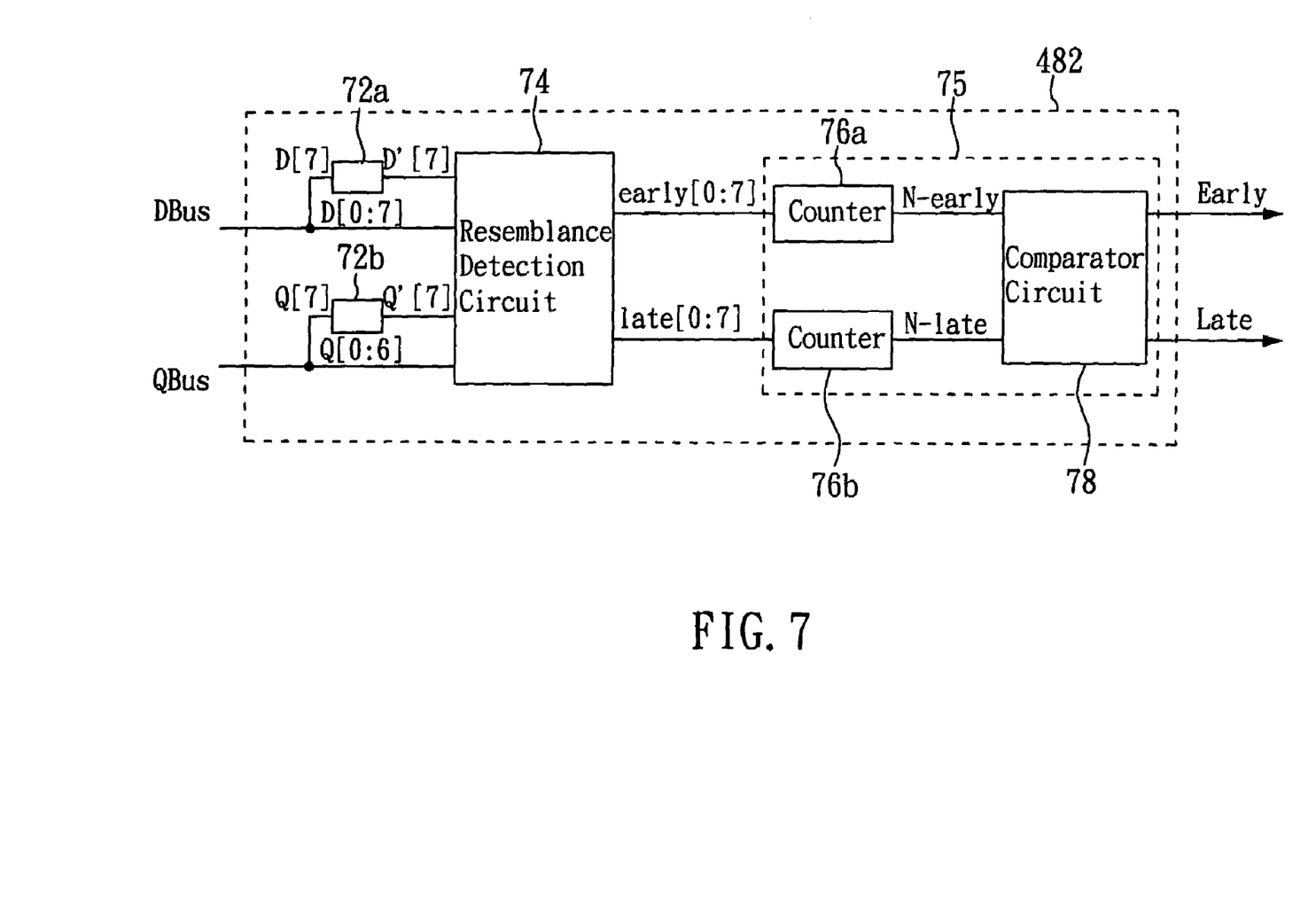
FIG. 7 depicts a circuit diagram of a preferred embodiment of the early/late determination circuit in FIG. 6.
Figure 8:
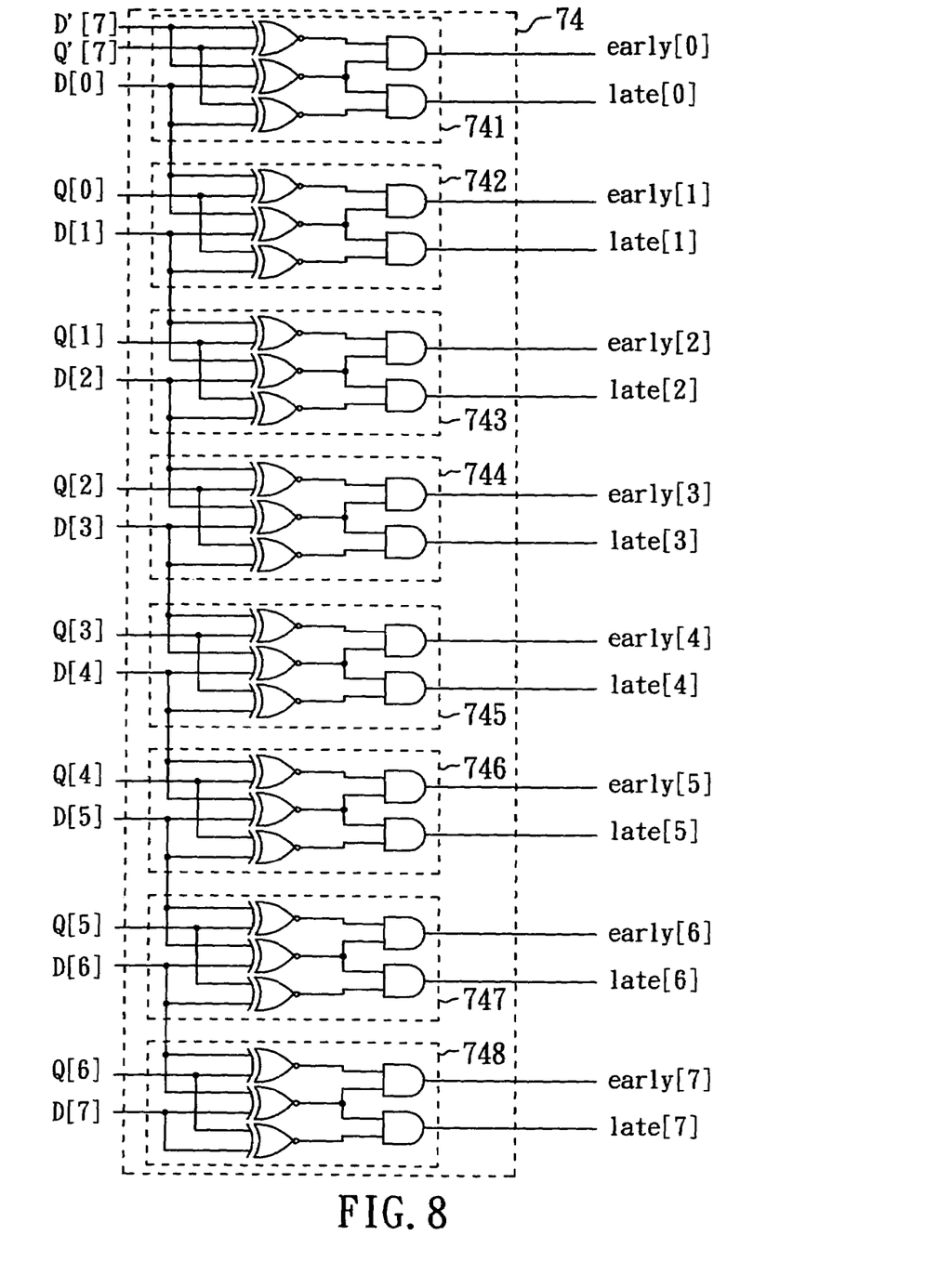
FIG. 8 depicts a circuit diagram of a preferred embodiment of the resemblance detection circuit in FIG. 7.

Please refer to FIG. 7, which shows a circuit diagram of a preferred embodiment of the early/late determination circuit 482 in FIG. 6. When a 8-bit parallel signal D[0:7] from the first sampled data stream Dbus and a 8-bit parallel Q[0:7] from the second sampled data stream Qbus are fed into the early/late determination circuit 482, eight data bits of the signal D[0:7] and seven data bits of the signal Q[0:6], together with the last data bits D'[7] and Q'[7] previously latched in the D-flip-flops 72a and 72b, are sent to a resemblance detection circuit 74 for performing a resemblance determination operation. A circuit diagram of a preferred embodiment of the resemblance detection circuit 74 is shown in FIG. 8. The resemblance detection circuit 74 comprises eight resemblance detecting units 741~748, each of which is used for detecting two adjacent bits from the data D'[7] and D[0:7] and one corresponding bit from the data Q'[7] and Q[0:6]. Each resemblance detecting unit 741~748 detects whether or not the two adjacent bits from the data D'[7] and D[0:7] are the same (i.e., whether a transition occurs between the two data bits). Moreover, in the case that the two adjacent bits are not the same (i.e., a transition occurs), the resemblance detecting unit 741~748 detects that whether the corresponding bit from the data Q'[7] and Q[0:6] is equal to the former or the latter of the two adjacent bits from the data D'[7] and D[0:7]. If the corresponding bit from the data Q'[7] and Q[0:6] is equal to the former of the two adjacent bits from the data D'[7] and D[0:7], an resemblance signal early [n]=1 is produced at the output. On the other hand, if the corresponding bit from the data Q'[7] and Q[0:6] is equal to the latter of the two adjacent bits from the data D'[7] and D[0:7], an resemblance signal late [n]=1 is produced at the output. Taking the resemblance detecting unit 742 for example, in the case of D[0]≠D[1], which means a transition occurs between D[0] and D[1], if Q[0]=D[0], then early [1]=1 and late [1]=0; if Q[0]=D[1], then early [1]=0 and late [1]=1. In the case of D[0]=D[1], which means no transition occurs between D[0] and D[1], the resemblance condition can not be determined and thus early [1] and late [1] are both "0". The thus generated 8-bit resemblance signals early [0:7] and late [0:7] are then fed into an early/late decision circuit 75, which comprises two counters 76a and 76b respectively for counting the number of bit "1" in each of the 8-bit resemblance signals early [0:7] and late [0:7] and producing the resulting numbers N-early and N-late. The early/late decision circuit 75 further comprises a comparator circuit 78 for comparing the number N-early and the number N-late. If N-early>N-late, which means the signal Q[n] in the current group resembles the former of the corresponding two bits in the first sampled data stream, then the early/late decision circuit 75 outputs an early signal "Early=1". On the other hand, if N-early<N-late, then the early/late decision circuit 75 outputs a late signal "Late=1". If N-early=N-late, which means the phase condition of the sampling clock cannot be determined, then the early signal "Early" and the late signal "Late" are both "0".

Referring again to FIG. 6, the early signal "Early" and the late signal "Late" generated by the early/late determination circuit 482 are further fed into an early/late summation circuit 483 for performing a summation operation. The early/late summation circuit 483 includes a multiplexer 484, which operates to produce an output signal "1" when the early signal "Early" is "1" and the late signal "Late" is "0", an output signal "−1" when the early signal "Early" is "0" and the late signal "Late" is "1", and an output signal "0" when both the early signal "Early" and the late signal "Late" are "0". The early/late summation circuit 483 further includes an adder 486 and a register 488, e.g., a 20-bit register. The adder 486 performs an addition operation to add the output signal (−1, 0, 1) from the multiplexer 484 to an accumulated amount stored in the register 488, and thus produces a new accumulated amount to be stored in the register 488. The accumulated amount in the register 488 serves as an early/late summation signal. Thereby, every time the early/late summation circuit 483 receives an early signal "Early=1", the adder 486 adds one to the accumulated amount; every time the early/late summation circuit 483 receives a late signal "Late=1", the adder 486 subtracts one from the accumulated amount.

The output of the early/late summation circuit 483 is connected to the low pass filter 489. After a predetermined time interval or after the early/late summation circuit 483 performs a predetermined number of operations, the low pass filter 489 checks the polarity of the early/late summation signal. In the case that the early/late summation signal is positive, the number of the early signals "Early" is greater than the number of the late signals "Late" and thus the sampling edges of the second clock signal CKQ and the forth clock signal CKQZ are determined to be in an early condition. Therefore, the low pass filter 489 produces a phase control signal to the clock generator 42 to correct the sampling clocks CKQ and CKQZ by appropriately shifting the phases backwards. On the other hand, in the case that the early/late summation signal is negative, the number of the late signals "Late" is greater than the number of the early signals "Early" and thus the sampling edges of the second clock signal CKQ and the forth clock signal CKQZ are determined to be in a late condition. Therefore, the low pass filter 489 produces a phase control signal to the clock generator 42 to correct the sampling clocks CKQ and CKQZ by appropriately shifting the phases forwards. In the case that the early/late summation signal is zero, no correction is made to the sampling clocks CKQ and CKQZ. Once the early/late summation signal is checked by the low pass filter 489, the register is reset to zero for the subsequent accumulation. In order to avoid deterioration of the display quality, the timing for the low pass filter 489 to check the early/late summation signal is preferably during the blank period, in which no image data is transmitted. In practice, the low pass filter 489 is designed to check the early/late summation signal and to correct the phases at a more frequent rate, for example, every 100~200 operations, before the system reaches a stable state. When the system becomes stable after a period of time, the frequency for checking the early/late summation signal can be reduced to a lower rate, for example, every 600~1000 operations.

While the present invention has been described with reference to the preferred embodiments thereof, it is to be understood that the invention should not be considered as limited thereby. Various modifications and changes could be conceived of by those skilled in the art without departuring from the scope of the present invention, which is indicated by the appended claims.

What is claimed is:

1. A data recovery circuit, comprising:

a clock generator for generating a first group of sampling clock pulses and a second group of sampling clock pulses for sampling an incoming data stream, each sampling edge of said first group of sampling clock pulses and each sampling edge of said second group of sampling clock pulses being arranged alternatively and being separated from each other for an interval equal to half the period of said incoming data stream, said clock generator being controlled in response to a phase control signal to adjust phases of said first group of sampling clock pulses and said second group of sampling clock pulses;

a data and phase sampling circuit for receiving said incoming data stream, said first group of sampling clock pulses and said second group of sampting clock pulses, said data and phase sampling circuit taking samples of said incoming data stream in accordance with said first group of sampling clock pulses to produce a first sampled data stream while taking samples of said incoming data stream in accordance with said second group of sampling clock pulses to produce a second sampled data stream; and a phase detection and correction circuit coupled to said data and phase sampling circuit, for determining resemblances of each bit in said second sampled data stream to the corresponding two bits in said first sampled data stream, the associated sampling edge of said bit in said second sampled data stream being adjacent to the associated sampling edges of said two bits in said first sampled data stream, said phase detection and correction circuit producing said phase control signal on the basis of the resemblance determination result;

wherein said first group of sampling clock pulses includes a first clock signal and said second group of sampling clock pulses includes a second clock signal, said first clock signal and said second clock signal are 90 degrees out of phase with each other, and both rising edges and falling edges of said first clock signal and said second clock signal are used as said sampling edges.

2. The data recovery circuit of claim 1, wherein said first sampled data stream is used as a data recovery output.

3. The data recovery circuit of claim 1, wherein said first group of sampling clock pulses and said second group of sampling clock pulses have the same frequency, which is equal to half the frequency of said incoming data stream.

4. The data recovery circuit of claim 1, wherein said first group of sampling clock pulses further includes a third clock signal and said second group of sampling clock pulses further includes a fourth clock signal, said first clock signal and said third clock signal are 180 degrees out of phase with each other, and said second clock signal and said fourth clock signal are 180 degrees out of phase with each other.

5. The data recovery circuit of claim 4, wherein rising edges of said first to said fourth clock signals are used as said sampling edges.

6. The data recovery circuit of claim 4, wherein falling edges of said first to said fourth clock signals are used as said sampling edges.

7. The data recovery circuit of claim 1, wherein said first group of sampling clock pulses and said second group of sampling clock pulses have the same frequency, which is equal to the frequency of said incoming data stream.

8. The data recovery circuit of claim 1, further comprising a demultiplexer coupled between said data and phase sampling circuit and said phase detection and correction circuit, for converting said first sampled data stream and said second sampled data stream from serial data to parallel data.

9. The data recovery circuit of claim 1, wherein said phase detection and correction circuit comprises:
    an early/late determination circuit for receiving said first sampled data stream and said second sampled data stream and determining resemblances of each bit in said second sampled data stream to the corresponding two bits in said first sampled data stream, the associated sampling edge of said bit in said second sampled data stream being adjacent to the associated sampling edges of said two bits in said first sampled data stream, said early/late determination circuit selectively producing an early signal and a late signal;
    an early/late summation circuit for receiving said early signal and said late signal and producing an early/late summation signal on the basis of a summation result of said early signal and said late signal; and
    a low pass filter for receiving said early/late summation signal and producing said phase control signal.

10. The data recovery circuit of claim 9, wherein said early/late determination circuit comprises:
    a resemblance detection circuit for detecting whether or not said corresponding two bits in said first sampled data stream are the same, detecting whether said bit in said second sampled data stream is equal to the former or the latter of said corresponding two bits if said two bits are not the same, and accordingly producing a resemblance signal of said bit; and
    an early/late decision circuit for receiving the resemblance signals of a predetermined number of bits, comparing the number of times that said bit is equal to the former of said corresponding two bits with the number of times that said bit is equal to the latter of said corresponding two bits, and selectively producing said early signal or said late signal.

11. The data recovery circuit of claim 9, wherein said early/late summation circuit performs an addition operation to add one to an accumulative amount responsive to receiving said early signal while performs an subtraction operation to subtract one from the accumulative amount responsive to receiving said late signal and outputs the accumulative amount as said early/late summation signal, and wherein said low pass filter produces said phase control signal on the basis of the polarity of said early/late summation signal obtained after a predetermined times of summation operations by said early/late summation circuit.

12. A phase detection circuit for detecting phase conditions of a first group of sampling clock pulses and a second group of sampling clock pulses in a data recovery circuit, said first group of sampling clock pulses being used for sampling approximately a central portion of each data bit in an incoming data stream to produce a first sampled data stream while said second group of sampling clock pulses being used for sampling approximately a transition portion between every two data bits in said incoming data stream to produce a second sampled data stream, said phase detection circuit comprising:
    an early/late determination circuit for receiving said first sampled data stream and said second sampled data stream, comprising:
    a resemblance detection circuit including a plurality of resemblance detecting units, each of said plurality of resemblance detecting units being used for detecting whether one of a plurality of bits in said second sampled data stream is equal to the former or the latter of the corresponding two bits in said first sampled data stream and producing one of a plurality of resemblance signals; and
    an early/late decision circuit for receiving said plurality of resemblance signals corresponding to said plurality of bits, comparing the number of times that one bit is equal to the former of the corresponding two bits with the number of times that one bit is equal to the latter of the corresponding two bits, and selectively producing an early signal or a late signal.

13. The phase detection circuit of claim 12, further comprising an early/late summation circuit for receiving said early signal and said late signal and producing an early/late summation signal on the basis of a summation result of said early signal and said late signal.

14. The phase detection circuit of claim 13, wherein said early/late summation circuit performs an addition operation to add one to an accumulative amount responsive to receiving said early signal while performs an subtraction operation to subtract one from the accumulative amount responsive to receiving said late signal and outputs the accumulative amount as said early/late summation signal.

15. A phase detection circuit for detecting phase conditions of a first group of sampling clock pulses and a second group of sampling clock pulses in a data recovery circuit, said first group of sampling clock pulses being used for sampling approximately a central portion of each data bit in an incoming data stream to produce a first sampled data stream while said second group of sampling clock pulses being used for sampling approximately a transition portion between every two data bits in said incoming data stream to produce a second sampled data stream, said phase detection circuit comprising:
    an early/late determination circuit for receiving said first sampled data stream and said second sampled data stream, said early/late determination circuit determining a resemblance of said first sampled data stream and said second sampled data stream by detecting whether one bit in said second sampled data stream is equal to the former or the latter of the corresponding two bits in said first sampled data stream and producing an early signal or a late signal; and
    an early/late summation circuit for receiving said early signal and said late signal and producing an early/late summation signal on the basis of a summation result of said early signal and said late signal.

16. A data recovery circuit, comprising:
    a clock generator for generating a first group of sampling clock pulses and a second group of sampling clock pulses for sampling an incoming data stream, each sampling edge of said first group of sampling clock pulses and each sampling edge of said second group of sampling clock pulses being arranged alternatively and being separated from each other for an interval equal to half the period of said incoming data stream, said clock generator being controlled in response to a phase control signal to adjust phases of said first group of sampling clock pulses and said second group of sampling clock pulses;

a data and phase sampling circuit for receiving said incoming data stream, said first group of sampling clock pulses and said second group of sampling clock pulses, said data and phase sampling circuit taking samples of approximately a central portion of each data bit in said incoming data stream in accordance with said first group of sampling clock pulses to produce a first sampled data stream while taking samples of approximately a transition portion of every two bits in said incoming data stream in accordance with said second group of sampling clock pulses to produce a second sampled data stream; and a phase detection and correction circuit coupled to said data and phase sampling circuit, for determine resemblances of each bit in said second sampled data stream to the corresponding two bits in said first sampled data stream, said phase detection and correction circuit defining an early condition for the phases of said first group of sampling clock pulses and said second group of sampling clock pulses if each bit in said second sampled data stream resembles the former of the corresponding two bits in said first sampled data stream while defining a late condition for the phases of said first group of sampling clock pulses and said second group of sampling clock pulses if each bit in said second sampled data stream resembles the latter of the corresponding two bits in said first sampled data stream, and producing said phase control signal on the basis of said early condition or said late condition to adjust the phases of said first group of sampling clock pulses and said second group of sampling clock pulses by shifting the phases backwards or forwards.

17. The data recovery circuit of claim 16, wherein said first sampled data stream is used as a data recovery output.

18. The data recovery circuit of claim 16, wherein said first group of sampling clock pulses and said second group of sampling clock pulses have the same frequency, which is equal to half the frequency of said incoming data stream.

19. The data recovery circuit of claim 18, wherein said first group of sampling clock pulses includes a first clock signal and said second group of sampling clock pulses includes a second clock signal, said first clock signal and said second clock signal being 90 degrees out of phase with each other, and both rising edges and falling edges of said first clock signal and said second clock signal being used as said sampling edges.

20. The data recovery circuit of claim 18, wherein said first group of sampling clock pulses includes a first clock signal and a third clock signal and said second group of sampling clock includes a second clock signal and a fourth clock signal, said first clock signal and said second clock signal being 90 degrees out of phase with each other, said first clock signal and said third clock signal being 180 degrees out of phase with each other, and said second clock signal and said fourth clock signal being 180 degrees out of phase with each other.

21. The data recovery circuit of claim 20, wherein rising edges of said first to said fourth clock signals are used as said sampling edges.

22. The data recovery circuit of claim 20, wherein falling edges of said first to said fourth clock signals are used as said sampling edges.

23. The data recovery circuit of claim 16, wherein said first group of sampling clock pulses and said second group of sampling clock pulses have the same frequency, which is equal to the frequency of said incoming data stream.

24. The data recovery circuit of claim 16, further comprising a demultiplexer coupled between said data and phase sampling circuit and said phase detection and correction circuit, for converting said first sampled data stream and said second sampled data stream from serial data to parallel data.

25. The data recovery circuit of claim 16, wherein said phase detection and correction circuit comprises:

an early/late determination circuit for receiving said first sampled data stream and said second sampled data stream, determining whether each bit in said second sampled data stream resembles the former or the latter of the corresponding two bits in said first sampled data stream, and selectively producing an early signal or a late signal;

an early/late summation circuit for receiving said early signal and said late signal and producing an early/late summation signal on the basis of a summation result of said early signal and said late signal; and a low pass filter for receiving said early/late summation signal and producing said phase control signal to adjust the phases of said first group of sampling clock pulses and said second group of sampling clock pulses by shifting the phases backwards or forwards.

26. The data recovery circuit of claim 25, wherein said early/late summation circuit performs an addition operation to add one to an accumulative amount responsive to receiving said early signal while performs an subtraction operation to subtract one from the accumulative amount responsive to receiving said late signal and outputs the accumulative amount as said early/late summation signal, and wherein said low pass filter produces said phase control signal on the basis of the polarity of said early/late summation signal obtained after a predetermined times of summation operations by said early/late summation circuit.

27. A method for detecting and correcting phase conditions in a data recovery circuit, comprising:

sampling approximately a central portion of each data bit in an incoming data stream in accordance with a first group of sampling clock pulses to produce a first sampled data stream while sampling approximately a transition portion between every two data bits in said incoming data stream in accordance with a second group of sampling clock pulses to produce a second sampled data stream;

detecting whether each bit in said second sampled data stream resembles the former or the latter of the corresponding two bits in said first sampled data stream;

summarizing a plurality of detection results produced in said detecting step to determine whether the phases of said first group of sampling clock pulses and said second group of sampling clock pulses are in an early condition or in a late condition; and adjusting the phases of said first group of sampling clock pulses and said second group of sampling clock pulses by shifting the phases backwards or forwards on the basis of said early condition or said late condition.

28. A method for detecting and correcting phase conditions in a data recovery circuit, comprising:

sampling approximately a central portion of each data bit in an incoming data stream in accordance with a first group of sampling clock pulses to produce a first sampled data stream while sampling approximately a transition portion between every two data bits in said incoming data stream in accordance with a second group of sampling clock pulses to produce a second sampled data stream;

combining a predetermined number of bits in said first sampled data stream into a group to form a plurality of first sampled data groups and combining a predetermined number of bits in said second sampled data stream into a group to form a plurality of second sampled data groups;

for each first sampled data group and the corresponding second sampled data group, detecting whether each bit in said second sampled data stream is equal to the former or the latter of the corresponding two bits in the first sampled data stream and respectively counting the number of times that said bit is equal to the former of said corresponding two bits and the number of times that said bit is equal to the latter of said corresponding two bits;

for each first sampled data group and the corresponding second sampled data group, producing an early signal if the number of times that said bit is equal to the former of said corresponding two bits is greater than the number of times that said bit is equal to the latter of said corresponding two bits, and producing a late signal if the number of times that said bit is equal to the latter of said corresponding two bits is greater than the number of times that said bit is equal to the former of said corresponding two bits;

summarizing a plurality of early signals and late signals to determine whether the phases of said first group of sampling clock pulses and said second group of sampling clock pulses are in a early condition or in a late condition; and adjusting the phases of said first group of sampling clock pulses and said second group of sampling clock pulses by shifting the phases backwards or forwards on the basis of said early condition or said late condition.

29. The method of claim 28, wherein said step of summarizing a plurality of early signals and late signals is carried out by performing an addition operation to add one to an accumulative amount responsive to receiving said early signal while performing an subtraction operation to subtract one from the accumulative amount responsive to receiving said late signal and outputting the accumulative amount as an early/late summation signal.

30. The method of claim 29, wherein said step of adjusting the phases of said first group of sampling clock pulses and said second group of sampling clock pulses by shifting the phases backwards or forwards is performed on the basis of the polarity of said early/late summation signal.

* * * * *